United States Patent
Hein

(10) Patent No.: US 11,732,706 B2
(45) Date of Patent: Aug. 22, 2023

(54) METHOD FOR SERVICE LIFE MONITORING OF A COMPRESSOR FOR A COMPRESSED AIR SYSTEM

(71) Applicant: Continental Teves AG & Co. OHG, Frankfurt am Main (DE)

(72) Inventor: Dierk Hein, Wedemark (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 359 days.

(21) Appl. No.: 17/022,252

(22) Filed: Sep. 16, 2020

(65) Prior Publication Data

US 2021/0095662 A1    Apr. 1, 2021

(30) Foreign Application Priority Data

Sep. 27, 2019 (DE) .................. 10 2019 214 858.1

(51) Int. Cl.
*F04B 49/06* (2006.01)
*F04B 49/10* (2006.01)
(Continued)

(52) U.S. Cl.
CPC .............. *F04B 49/06* (2013.01); *F04B 49/02* (2013.01); *F04B 49/065* (2013.01); *F04B 49/10* (2013.01); *B60G 17/0155* (2013.01); *F04B 2201/0801* (2013.01); *F04B 2203/0205* (2013.01); *F04B 2205/10* (2013.01); *F04B 2205/11* (2013.01)

(58) Field of Classification Search
CPC ........ F04B 49/10; F04B 49/02; F04B 49/065; F04B 2201/0801; F04B 2205/11; F04B 49/06; F04B 2203/0205; F04B 2205/10; F04B 2207/043; F04B 2203/0405; B60G 17/0155

See application file for complete search history.

(56) References Cited

U.S. PATENT DOCUMENTS

| | | | | |
|---|---|---|---|---|
| 4,328,678 A | * | 5/1982 | Kono ...................... | F04B 49/10 62/158 |
| 6,171,065 B1 | * | 1/2001 | Wode .................. | B60G 17/0408 417/32 |

(Continued)

FOREIGN PATENT DOCUMENTS

| | | |
|---|---|---|
| CH | 696215 A5 | 2/2007 |
| CN | 101218401 A | 7/2008 |

(Continued)

OTHER PUBLICATIONS

Search Report dated May 24, 2022 from corresponding Chinese patent application No. 202011028632.0.

(Continued)

*Primary Examiner* — Peter J Bertheaud

(57) ABSTRACT

A method for operating a compressor for a compressed air system of a motor vehicle, in particular an air suspension system, wherein an operating temperature of the compressor is determined and used as a criterion for the compressor to be operated until a switch-off temperature (T) is reached, wherein a switch-on duration (t) until reaching the switch-off temperature (T) is determined, and the determined switch-on duration (t) is adjusted by a parameter (LP) dependent on the switch-off temperature (T) reached.

14 Claims, 1 Drawing Sheet

(51) Int. Cl.
*F04B 49/02* (2006.01)
*B60G 17/015* (2006.01)

(56) References Cited

U.S. PATENT DOCUMENTS

| | | | |
|---|---|---|---|
| 6,212,451 B1 | 4/2001 | Kutscher et al. | |
| 2002/0187048 A1 | 12/2002 | Meier et al. | |
| 2006/0228214 A1 | 10/2006 | Mabe et al. | |
| 2007/0098564 A1 | 5/2007 | Sorge | |
| 2010/0303637 A1* | 12/2010 | Engelhardt | F04B 49/02 417/32 |
| 2012/0204560 A1 | 8/2012 | Dixon | |
| 2013/0004333 A1* | 1/2013 | Engelhardt | F04B 49/10 417/32 |
| 2013/0101437 A1* | 4/2013 | Engelhardt | F04B 49/06 417/32 |
| 2013/0124040 A1* | 5/2013 | Engelhardt | B60G 11/27 701/37 |
| 2014/0163838 A1 | 6/2014 | Moeckly et al. | |

FOREIGN PATENT DOCUMENTS

| | | |
|---|---|---|
| CN | 102034150 A | 4/2011 |
| CN | 102635436 A | 8/2012 |
| CN | 202833064 U | 3/2013 |
| CN | 104406339 A | 3/2015 |
| CN | 107525318 A | 12/2017 |
| CN | 109163917 A | 1/2019 |
| CN | 109372785 A | 2/2019 |
| CN | 109578313 A | 4/2019 |
| DE | 3919407 A1 | 1/1990 |
| DE | 19621946 C1 | 9/1997 |
| DE | 19810764 A1 | 9/1999 |
| DE | 19812234 A1 | 9/1999 |
| DE | 10120206 A1 | 10/2002 |
| DE | 10330121 A1 | 2/2005 |
| DE | 102006039538 A1 | 3/2008 |
| DE | 102007008736 A1 | 8/2008 |
| DE | 102010016131 A1 | 9/2011 |
| DE | 102012223097 A1 | 6/2014 |
| EP | 1253321 A2 | 10/2002 |
| EP | 1961960 A2 | 8/2008 |
| EP | 2120214 A1 | 11/2009 |
| JP | H05322394 A | 12/1993 |
| JP | 2006166569 A | 6/2006 |
| JP | 2008050965 A | 3/2008 |

OTHER PUBLICATIONS

Office Action dated May 30, 2022 from corresponding Chinese patent application No. 202011028632.0.
Search Report dated May 18, 2020 from corresponding German Patent Application No. DE 10 2019 214 858.1.

* cited by examiner

METHOD FOR SERVICE LIFE MONITORING OF A COMPRESSOR FOR A COMPRESSED AIR SYSTEM

CROSS REFERENCE TO RELATED APPLICATIONS

This application claims priority to German Patent Application No. DE 10 2019 214 858.1, filed Sep. 27, 2019, wherein the contents of such application is incorporated herein by reference.

TECHNICAL FIELD

A method for operating a compressor for a compressed air system of a motor vehicle.

TECHNICAL BACKGROUND

The compressor of a compressed air system should as far as possible always be available for control processes of the system. In order to protect the compressor from overheating during operation, often temperature models are used which simulate the operating temperature of loaded components or parts of the compressor and serve as a criterion for switching off the compressor when a certain limit or switch-off temperature is reached. However, temperature sensors on the loaded components are also used, which send a temperature signal to the electronic control device controlling the compressor.

The compressor must achieve a specific service life. Therefore usually a switch-off temperature is selected at which the material limit temperatures of the compressor components are not exceeded and the required service life is achieved without failure of critical components. The switch-off temperature thus established with respect to the required service life then applies to all operating conditions or all operating parameters of the compressor. Operating parameters may be the ambient temperature, the pressure load of the compressor and the current load of the electric compressor drive.

At high ambient temperatures, the availability of the compressor is however very low since the switch-off temperature is reached more quickly. At low ambient temperatures, the availability of the compressor is indeed very high, but sometimes this is not required. The same systematic approach applies to the pressure and current loading.

A greater availability of the compressor may be achieved by a higher switch-off temperature. This however leads to a reduced service life since essential components of the compressor are operated at high component temperatures and are therefore subject to greater wear.

A lower switch-off temperature may indeed achieve a longer service life, but the actual load on the compressor components is far from the permitted material limit temperatures. This leads to a reduced availability of the compressor because the lower switch-off temperature is reached much earlier and the required runtime of the compressor is not sufficient for any control processes.

The availability of the compressor may be improved if the switch-off temperature for the compressor is selected variably by reference to peripheral load conditions such as ambient temperature or current load.

DE 10 2010 016 131 A1 describes a method for controlling a compressor of a compressed air supply system in which the limit temperature for switching the compressor on and off is determined using a temperature calculation model in which the parameters of ambient temperature, system pressure and compressor runtime have an influence. The compressor operating temperature is determined by correlation of the mutual temperature dependency which results from the heat transmission between two adjacent components.

A variable switch-off temperature however leads to a changed service life of the compressor. Accordingly, in the method according to the prior art, the remaining service life is unknown and there is a danger that the compressor will fail prematurely.

What is needed is a way to increase the availability of the compressor and its security against failure.

BRIEF DESCRIPTION OF THE DRAWINGS

Further embodiments of the invention will emerge from the subclaims and the following description of an exemplary embodiment with reference to the figures.

The drawings show.

DETAILED DESCRIPTION

Figure 1:
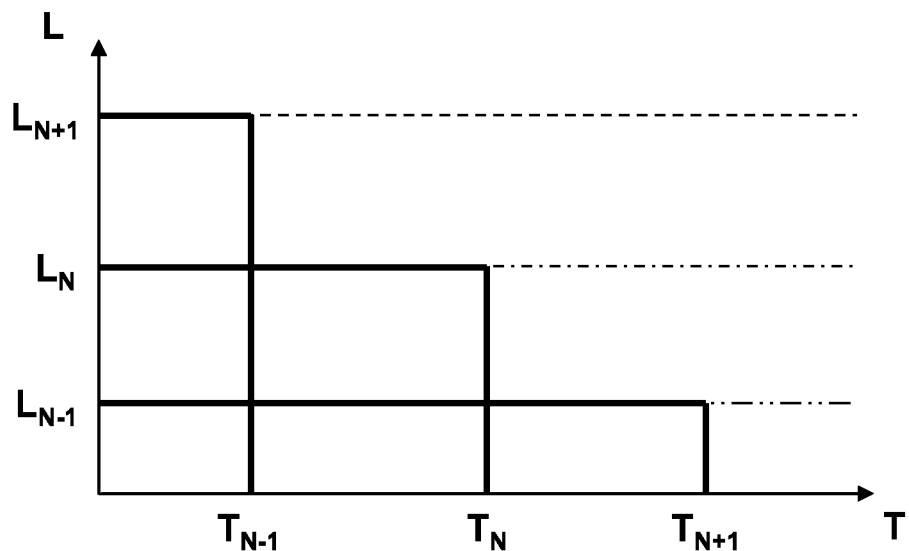
FIG. 1 an exemplary temperature-service life diagram.

A method is provided for operating a compressor for a compressed air system of a motor vehicle, wherein an operating temperature of the compressor is determined and used as a criterion for the compressor to be operated until a switch-off temperature is reached, wherein a switch-on duration until reaching the switch-off temperature is determined, and the determined switch-on duration is adjusted by a parameter dependent on the switch-off temperature reached.

The compressor can be switched on and off depending on need. If demand signals from the compressed air system are sent to the compressor control unit, the compressor is switched on, whereby the compressed air necessary for the desired control process is compressed and transferred to the compressed air system. The compressed air system is optionally an air suspension system, but a pneumatic braking system may also be supplied by the compressor.

The invention is based on the knowledge that at high operating parameters, a higher switch-off temperature should be selected than the actual nominal switch-off temperature of the compressor, in order to have sufficient compression runtime available for the desired control process. This gives a greater availability of the compressor. In longer term operation however, the compressor enters a critical temperature range at which the compressor components may be damaged or are already beginning to wear.

When favorable or low operating parameters apply, a lower switch-off temperature than the nominal switch-off temperature may be selected, wherein an acceptable compressor availability is still present. On the other hand, the maximum possible component load is not effectively utilized.

The invention now proposes that after the compressor operating temperature has reached the switch-off temperature, the switch-on duration of the compression process is established and adjusted by a parameter which applies to the actual switch-off temperature. The parameter effectively constitutes a degree of wear which occurs to the compressor components when operated up to the respective switch-off temperature. Thus for each compression process, a weighted switch-on time is obtained which may be used for monitoring the service life. Using this weighted switch-on time, the compressor wear can be estimated well.

According to an embodiment, the adjusted switch-on duration is determined for each compression process of the compressor and totaled to form a total runtime of the compressor. This allows a qualified conclusion about the runtime of the compressor which most closely reflects the actual load.

According to an embodiment, the total compressor runtime is compared with a predefined nominal service life. By comparing the elapsed operating time of the compressor with its predefined nominal service life, the remaining service life can be determined, or it can be estimated much better and more precisely when the nominal service life will be reached or if it has already expired.

The service life of the present compressor is indicated in operating hours. Within this period, the compressor may be used without exchange of core components or complete failure. If the compressor is regularly operated far above its nominal switch-off temperature, the number of remaining operating hours falls significantly. The nominal service life may then no longer even be reached. The advantage therefore exists that a very precise estimate of the remaining service life may be made.

According to an embodiment, the switch-off temperature lies within a temperature range between a first predefined and a second predefined limit switch-off temperature. The first and second predefined limit switch-off temperatures indicate a temperature range within which the compressor is operated. In particular, the first limit switch-off temperature is significant since it serves as an upper limit. If the operating temperature exceeds its upper limit, immediate damage to the compressor components and a failure of the compressor must be expected.

The service life monitoring is thus particularly effective if a value for the parameter for service life monitoring is determined continuously for each degree of shut-off temperature within the predefined limit values. This allows a very precise estimate of service life.

If the compressor is always operated close to the upper limit, its service life is reduced significantly. The first predefined limit switch-off temperature is reduced when a predefined total runtime of the compressor is reached. For a predefined value, the maximum permitted upper limit temperature can be reduced as a percentage dependent on the nominal service life of the compressor in order to protect the compressor from an impending failure. The compressor materials are utilized much better, which is associated with a cost saving because the compressor need not be designed for the worst case.

According to an embodiment, the switch-off temperature is determined as a function of one or more operating parameters. In one or more embodiments, the ambient temperature or a current value is used as an operating parameter.

The ambient temperature may be used as a basis for the load and heating of the compressor and is normally available via the vehicle's on-board data network. In the automotive sector, ambient temperatures from −40° C. to +80° C. are specified. For the same compressor runtime for a control process therefore, because of the ambient temperature, different switch-off temperatures apply and hence differently weighted runtimes.

The reciprocating pistons of the compressor are driven by an electric motor. The motor current used has an effect on the load and wear on the motor brushes. Thus the motor current defines the load and service life of the compressor. Since a current sensor is already fitted in the control device, the current load may be used as an operating parameter for determining the switch-off temperature.

According to an embodiment, the operating temperature is determined using a temperature calculation model or via a temperature sensor. For each compression process therefore, the operating temperature is determined and used as a criterion for controlling the compressor. If the operating temperature reaches the determined switch-off temperature, the compression process is ended and the supply of compressed air stopped.

The method according to the invention is used in operation of a compressor for a compressed air system of a motor vehicle. Here, the method is executed by an electronic control device which also controls the electronic drive of the compressor and any valves of the compressed air system. The control device is provided with means which allow detection and measurement of temperatures, and means which perform calculations based on the temperature values and send corresponding actuation signals to the compressor drive.

FIG. 1 shows an exemplary temperature-service life diagram. The switch-off temperature T is shown on the abscissa, and the service life L of the compressor on the ordinate. The exemplary method for service life monitoring will be illustrated with reference to this diagram.

Initially, a nominal switch-off temperature $T_N$ is established for the compressor. If the compressor is always operated up to the nominal switch-off temperature $T_N$, it will achieve a specified nominal service life $L_N$. Since however the compressor is not always operated with a constant switch-off temperature, the diagram shows a lower switch-off temperature $T_{N-1}$ and an upper switch-off temperature $T_{N+1}$. The wear on critical components of the compressor, e.g. the motor brushes, is highly temperature-dependent. Above the upper switch-off temperature $T_{N+1}$, these components will be damaged, so this limit must not be exceeded.

If the compressor is always operated up to the upper switch-off temperature $T_{N+1}$, its available service life will be reduced to a shorter service life $L_{N-1}$. With constant compressor operation up to the lower switch-off temperature $T_{N-1}$, the compressor will achieve a longer service life $L_{N+1}$.

Figure 2:
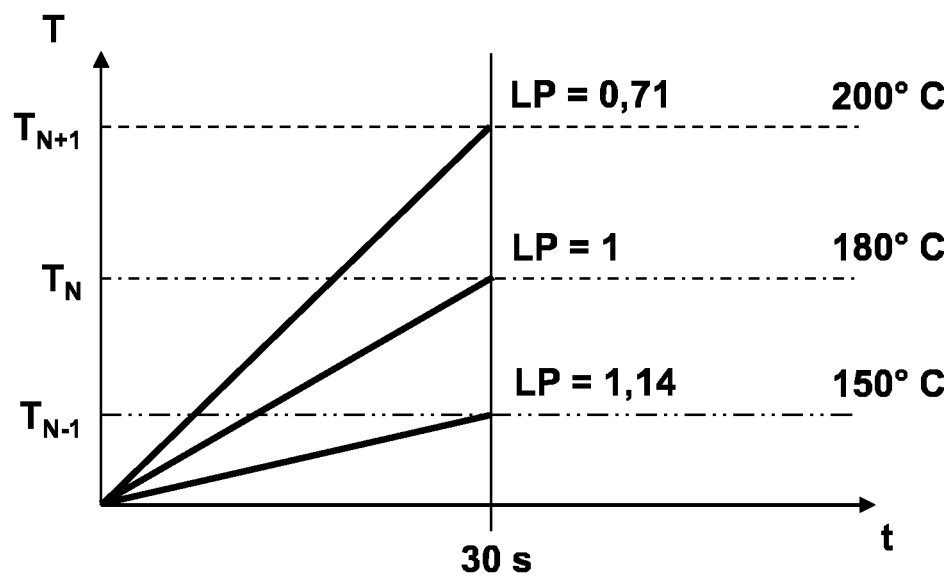
FIG. 2 an exemplary time-temperature diagram.

The method for service life monitoring is explained in more detail using the time-temperature diagram of FIG. 2 with the following exemplary values. The switch-on time t is plotted on the abscissa and the switch-off temperature T on the ordinate. The switch-on time t gives the duration for which the compressor is operated until reaching the switch-off temperature T. It is the time which the compressor requires for a compression process.

The nominal switch-off temperature $T_N$ is in this case set at 180° C. With this switch-off temperature, the compressor achieves a nominal service life $L_N$ of 350 hours (h). The compressor may be operated up to an upper switch-off temperature $T_{N+1}$ of 200° C. and then achieves a shorter service life $L_{N-1}$ of 250 h. The lower switch-off temperature $T_{N-1}$ is 150° C., at which a longer service life $L_{N+1}$ of 400 h is achieved.

In order to obtain the greatest possible availability of the compressor, the control device allows a compression process up to the upper shut-off temperature $T_{N+1}$. Since however the specified service life $L_N$ cannot be achieved in this way, the available or remaining service life should be monitored in operation.

An exemplary evaluation of a compression process then takes place. A compression process is the switch-on duration for which the reciprocating compressor piston or pistons driven by the electric motor compress the aspirated atmospheric air to a higher pressure and deliver it into the compressed air system. A certain compression duration is required in order to perform the requested control processes of the compressed air system. The control processes of the compressed air system are for example, in the case of the air suspension system, the refilling of the pressure accumulator or the filling of the air springs in order to lift a vehicle to a higher level.

Such a compression process is evaluated with a predefined service life parameter LP. The service life parameter LP is dependent on the measured or calculated switch-off temperature T which applies to the actual compression process. Thus the equation applies:

$$LP=f(T)$$

With the above exemplary values, the following service life parameters are obtained.

For the nominal switch-off temperature $T_N$, the service life parameter is $$LP_1=350 \text{ h}/350 \text{ h}=1$$

For the upper switch-off temperature $T_{N+1}$, the service life parameter is $$LP_2=250 \text{ h}/350 \text{ h}=0.71$$

For the lower switch-off temperature $T_{N-1}$, the service life parameter is $$LP_3=400 \text{ h}/350 \text{ h}=1.14$$

For each compression process, the respective switch-on duration until reaching the applicable switch-off temperature is determined and divided by the associated service life parameter LP. This adjustment of the switch-on duration gives an evaluation which allows a conclusion about the wear state.

For example, in a compression process up to reaching the nominal switch-off temperature $T_N$, a complete control process is performed within 30 seconds (s). If this complete control process with a switch-on duration of 30 s is performed at high ambient temperatures, the compressor reaches for example the upper switch-off temperature $T_{N+1}$. Accordingly, the 30 s switch-on time is adjusted by the service life parameter $LP_2$, whereby the following first weighted runtime for this compression process is obtained:

$$L_{B1}=30 \text{ s}/0.71=42 \text{ s}$$

Accordingly, for this compression process, a component load applies which corresponds to a compressor runtime of 42 s up to the nominal switch-off temperature $T_N$ If the compression process of 30 s however is carried out up to the lower switch-off temperature $T_{N-1}$, this gives a second weighted runtime:

$$L_{B2}=30 \text{ s}/1.14=26 \text{ s}$$

During this compression process, the compressor components were therefore less heavily loaded.

With this knowledge or these weighted runtimes per compression process, the service life of the compressor can be monitored. Thus a total runtime of the compressor is calculated from the total of weighted runtimes per compression process:

$$GL=\Sigma(t/LF)$$

Totaling the weighted runtimes into a completed total compressor runtime allows the compressor service life to be monitored. If we compare the total runtime with the predefined nominal service life $L_N$, the remaining or residual service life of the compressor can then be determined.

$$L_{REST}=L_N-GL$$

The result shows for how long the compressor can still be operated until components wear and the compressor fails.

Knowledge of the remaining or residual service life also brings the advantage that the selection of switch-off temperature can be controlled much better by the control device. If for example 80% of the nominal service life $L_N$ has already been reached, it may be provided that the upper switch-off temperature $T_{N+1}$ is set lower or the compressor may no longer be permitted to reach a switch-off temperature above the nominal switch-off temperature. In this way, the compressor can be operated for slightly longer and premature failure can be avoided.

Finally, the exemplary service life monitoring allows a message to be given that the compressor will shortly require servicing.

LIST OF REFERENCE SIGNS

L Service life
$L_N$ Nominal service life
$L_{N+1}$ First (upper) service life
$L_{N-1}$ Second (lower) service life
LP Service life parameter
t Switch-on time
T Switch-off temperature
$T_N$ Nominal switch-off temperature
$T_{N+1}$ First (upper) switch-off temperature
$T_{N-1}$ Second (lower) switch-off temperature

The invention claimed is:

1. A method for operating a compressor for a compressed air system of a motor vehicle, the method comprising:
    determining an operating temperature of the compressor and using the operating temperature as a criterion for the compressor to be operated until a switch-off temperature is reached;
    measuring a switch-on duration until the switch-off temperature is reached ; and
    calculating a weighted runtime based on the measured switch- on duration with a life parameter which depends on the switch-off temperature reached.

2. The method as claimed in claim 1, wherein the switch-on duration is measured for each compression process of the compressor and totaled to form a total runtime of the compressor.

3. The method as claimed in claim 2, wherein the total runtime of the compressor is compared with a predefined nominal service life.

4. The method as claimed in claim 1, wherein the switch-off temperature lies within a temperature range between a first predefined and a second predefined limit switch-off temperature.

5. The method as claimed in claim 2, wherein the switch-off temperature lies within a temperature range between a first predefined and a second predefined limit switch-off temperature.

6. The method as claimed in claim 3, wherein the switch-off temperature lies within a temperature range between a first predefined and a second predefined limit switch-off temperature.

7. The method as claimed in claim 3, wherein on reaching a predefined total runtime of the compressor, the first predefined limit switch-off temperature is reduced.

8. The method as claimed in claim 4, wherein on reaching a predefined total runtime of the compressor, the first predefined limit switch-off temperature is reduced.

9. The method as claimed in claim 1, wherein the switch-off temperature is determined as a function of one or more operating parameters.

10. The method as claimed in claim 9, wherein at least one ambient temperature is used as an operating parameter.

11. The method as claimed in claim 9, wherein at least one current value is used as an operating parameter.

12. The method as claimed in claim 1, wherein the operating temperature is determined using a temperature calculation model.

13. The method as claimed in claim 1, wherein the operating temperature is determined using a temperature sensor.

14. The method as claimed in claim 1, wherein the compressed air system is an air suspension system.

* * * * *